United States Patent [19]

Putnam et al.

[11] Patent Number: 5,095,396
[45] Date of Patent: Mar. 10, 1992

[54] UNITARY E-BLOCK ASSEMBLY FOR USE IN A DISK DRIVE

[75] Inventors: John S. Putnam, Excelsior; Hugh A. Ritchey, Minnetonka, both of Minn.

[73] Assignee: Seagate Technology, Inc., Scotts Valley, Calif.

[21] Appl. No.: 569,818

[22] Filed: Aug. 20, 1990

[51] Int. Cl.⁵ .................... G11B 5/55; G11B 21/08
[52] U.S. Cl. .................... 360/106; 360/105; 360/107; 360/108; 360/97.01
[58] Field of Search .................... 360/103–109, 360/97.02, 69, 97.01

[56] References Cited

U.S. PATENT DOCUMENTS

| | | | |
|---|---|---|---|
| 3,912,278 | 10/1975 | Teutsch | 360/97.02 |
| 4,402,025 | 10/1980 | Anderson et al. | 360/98 X |
| 4,616,279 | 10/1986 | Poorman | 360/103 |
| 4,620,248 | 10/1986 | Gitzendanner | 360/97.02 |
| 4,697,077 | 9/1987 | Weber et al. | 360/108 |
| 4,853,811 | 8/1989 | Brooks, Jr. et al. | 360/103 |
| 4,860,135 | 8/1989 | Cain | 360/106 |
| 4,879,617 | 11/1989 | Sampietro et al. | 360/105 |
| 4,894,739 | 1/1990 | Kobayashi | 360/97.02 |
| 4,933,785 | 6/1990 | Morehouse et al. | 360/105 |
| 4,933,791 | 6/1990 | Cheng | 360/104 |
| 4,979,062 | 12/1990 | Stefansky et al. | 360/97.02 |

FOREIGN PATENT DOCUMENTS

| | | | |
|---|---|---|---|
| 0344366 | 12/1989 | European Pat. Off. | 360/104 |
| 58-29183 | 2/1983 | Japan | 360/97.02 |
| 61-3381 | 1/1986 | Japan | 360/97.02 |

Primary Examiner—Aristotelis Psitos
Assistant Examiner—Alfonso Garcia
Attorney, Agent, or Firm—Kinney & Lange

[57] ABSTRACT

An E-block assembly is used in a disk drive which reads and writes information to a plurality of magnetic disks. The E-block assembly includes a plurality of sliders, each slider including a magnetic transducer for reading information from one of the plurality of magnetic disks. A plurality of load beams are each coupled to one of the plurality of sliders. A unitary E-block has a first side and a second side and a plurality of load beams is coupled to an arm. The unitary E-block is suitable for being coupled to an actuator for moving the arms relative to the magnetic disks. A plurality of component support members mounted to one of the first or second sides of the unitary E-block has a plurality of component support members. The component support members support electrical components for use in reading information from and writing information to the magnetic disks.

26 Claims, 5 Drawing Sheets

UNITARY E-BLOCK ASSEMBLY FOR USE IN A DISK DRIVE

A copending patent application entitled APPARATUS FOR CENTERING A TRANSDUCER OVER A TRACK OF A MAGNETIC DISK, U.S. Ser. No. 390,178, filed Aug. 7, 1989 and assigned to same assignee as the present application is fully incorporated herein by reference.

BACKGROUND OF THE INVENTION

The present invention relates to hard disk data storage systems. More particularly, the present invention relates to a unitary E-block assembly for use in a disk drive.

Hard disk data storage systems typically contain several magnetic disks on which data is stored in sectors which lie in concentric tracks on the disks. A transducer (or head) is mounted to a slider and flies above a track. While flying above the track, the transducer is controlled to write, or magnetically encode, data in a sector on the track. The head is also capable of reading the magnetically encoded data from the sector.

An electromechanical actuator operates within a negative feedback, closed-loop servo system. The actuator moves the head radially for track seek operations and holds the transducer directly over a track for track following operations. Typically, a stack of disks is mounted on a spindle. Each surface on each magnetic disk has one corresponding head. All heads are moved together by the electromechanical actuator to different tracks on the disk surface.

In a typical system, several transducers are used for reading data from, and writing data to surfaces on the magnetic disks. These transducers are referred to as data transducers. Disk drive control electronics provide a write signal to the data transducers to write data onto the magnetic disks. In addition, the drive control electronics receive the read signal provided by the data transducers to read data from the magnetic disks.

Another transducer is used with a disk surface that is dedicated to contain servo tracks having servo sectors encoded with servo position information. The corresponding transducer is referred to as a servo transducer. The servo transducer flies over the servo sectors as the disk rotates and produces a servo signal representative of the servo position information written. The disk drive control electronics are provided with the servo signal and, based on the servo signal control the electromechanical actuator in positioning the heads over the magnetic disks.

The read signal from the data transducers, as well as the servo signal from the servo transducer, must be conditioned before they are usable by the drive control electronics. The signal conditioning generally involves amplification. Also, the write signal provided by the drive control electronics must undergo conditioning before it is in proper form to be used by the data transducer in writing data to the magnetic disk. This conditioning also typically involves amplification.

In past high performance disk drives, the actuator was coupled to the data and servo transducers by individual support arms. A pair of transducers was coupled to an individual support arm by load beams. Also, conditioning or preamplification circuitry was mounted directly to each individual support arm. The preamplification circuitry provided the necessary amplification to the read or write signals (where the transducers were data transducers) as well as to the servo signal (where one of the transducers was a servo transducer). When the individual support arm assemblies were completed, they were assembled with a number of other support arm assemblies to form an actuator assembly.

However, the preamplification circuitry mounted to the individual support arms typically included at least one integrated circuit chip. The integrated circuit chip was mounted to the top or bottom surface of the support arm, and conductors were provided from the transducer to the integrated circuit chip. Also, conductors, or cables, were provided from the integrated circuit chip to additional conditioning or demodulating logic located on a circuit board mounted away from the electromechanical actuator in the disk drive. Assembly of the preamplification circuitry on the individual support arms proved to be difficult where the E-block was not formed of individual support arms.

SUMMARY OF THE INVENTION

The present invention relates to mounting of the preamplification circuitry where a unitary E-block is used. A unitary E-block is an assembly wherein all of the support arms are formed integrally. Since all of the support arms are formed integrally, it is very difficult to mount any circuitry on the top or bottom surfaces of the support arms. However, it is also important to have the preamplification circuitry as close to the transducers as possible in order to eliminate any noise.

Therefore, the present invention is an E-block assembly in a disk drive for reading information from and writing information to a plurality of magnetic disks. The E-block includes a plurality of sliders, each slider includes a magnetic transducer for reading information from one of the plurality of magnetic disks. A plurality of load beams are coupled to the sliders. A unitary E-block has a plurality of integrally formed arms wherein each of the load beams is coupled to an arm. The unitary E-block is suitable for being coupled to an actuator for moving the arms relative to the magnetic disks. A plurality of component support members are mounted to a side of the unitary E-block. The component support members support electrical components for use in reading information from and writing information to the magnetic disks.

In one embodiment of the present invention, the component support members include a first support member for supporting data preamps used in retrieving data from and writing data to the magnetic disks through the data transducers. Also, a second support member is included for supporting a servo preamp which is used in retrieving servo information from the servo disk through the servo transducer. Also, flex cables are coupled from the data and servo preamps to the drive control electronics.

DETAILED DESCRIPTION OF THE PREFERRED EMBODIMENTS

Figure 1:
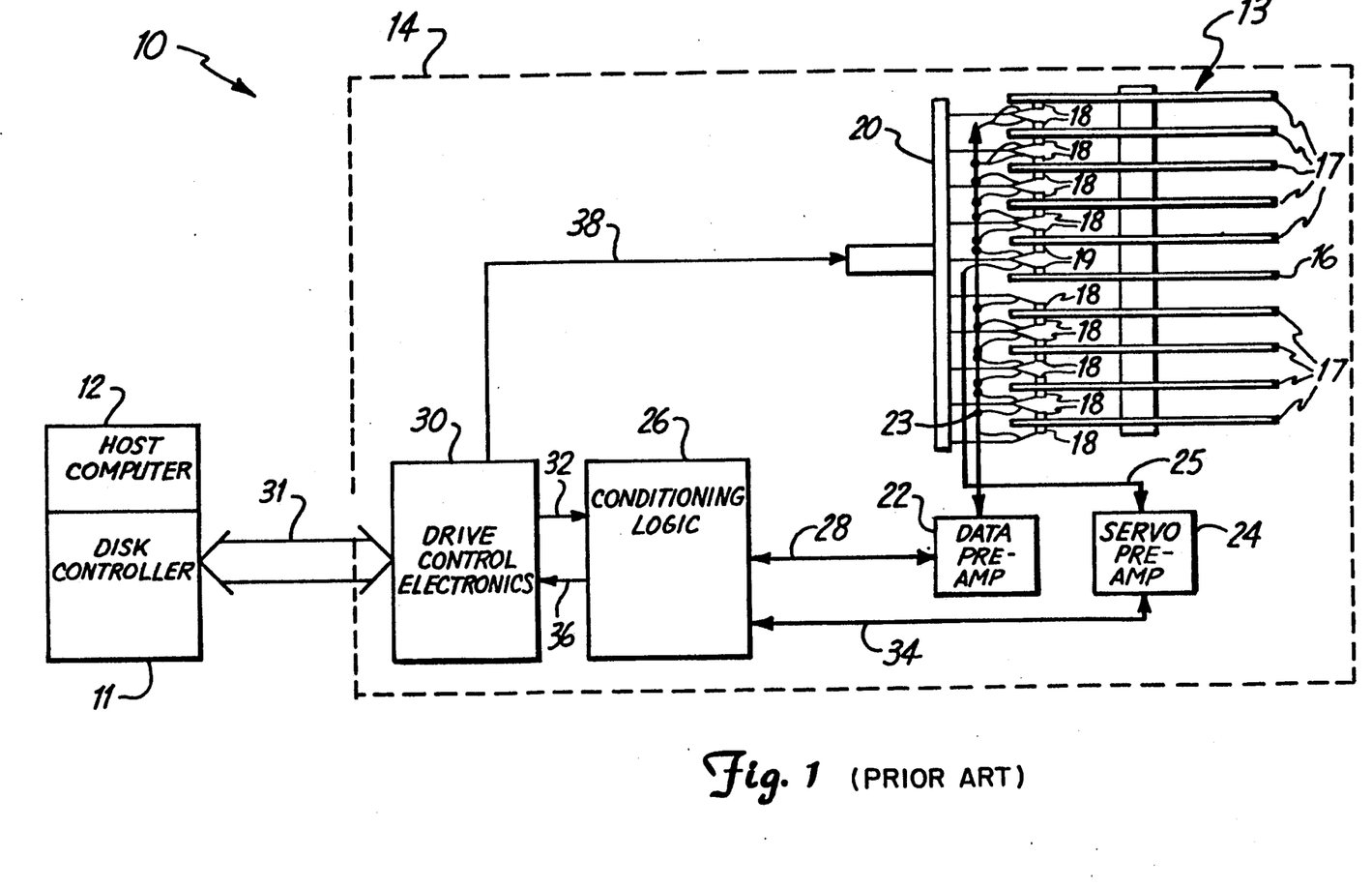
FIG. 1 is a block diagram of a disk drive system.

FIG. 1 is a block diagram of a disk drive system 10. Disk drive system 10 includes host computer 12 disk controller 11 and disk drive 14. Disk drive 14 includes a stack of magnetic disks shown generally at 13. Stack 13 includes a plurality of disks 16 and 17. Each disk 17 includes a pair of recording surfaces dedicated to storing data received from host computer 12. Disk 16 includes a pair of recording surfaces, with one surface dedicated to storing servo information. Each disk 17 corresponds to at least one data transducer 18. Typically, each recording surface of each data disk 17 corresponds to a data transducer 18. Also, one recording surface of disk 16 corresponds to servo transducer 19. In the embodiments shown in the FIGURES, the stack of magnetic disks shown generally at 13 includes ten individual disks. However, any number of disks may be used in accordance with the present invention. For example, in one preferred embodiment, stack 13 includes eleven individual disks.

Figure 2:
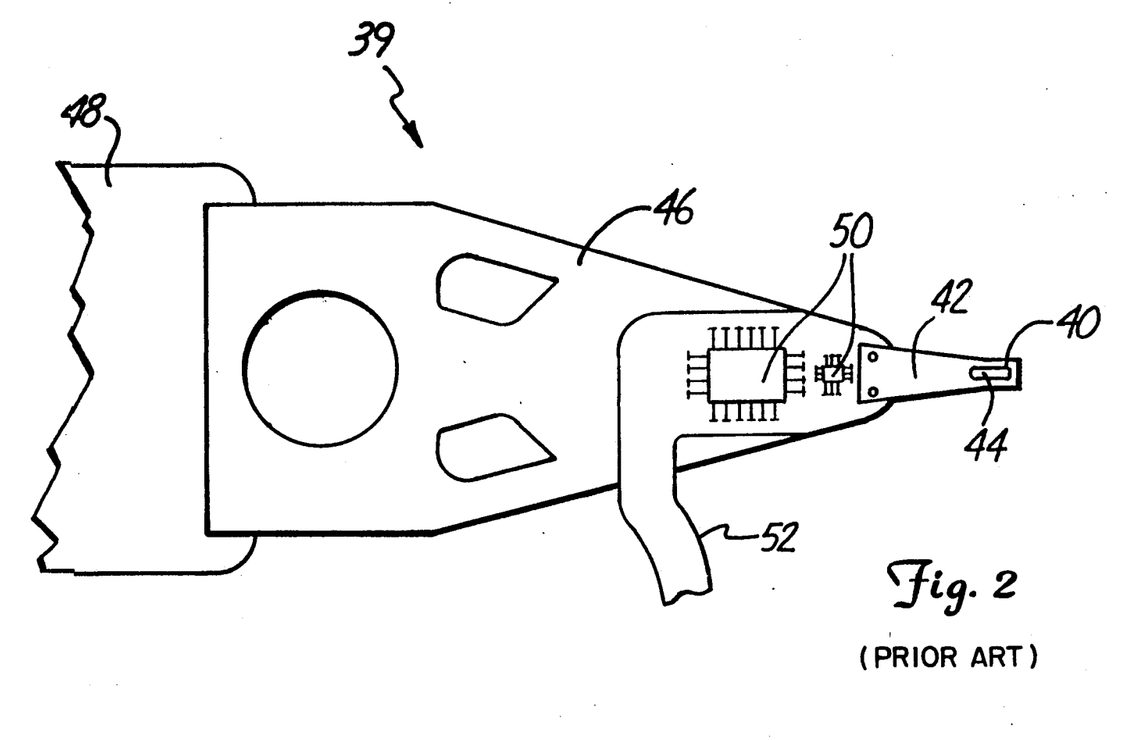
FIG. 2 is an illustration of an individual support arm assembly.
Figure 4:
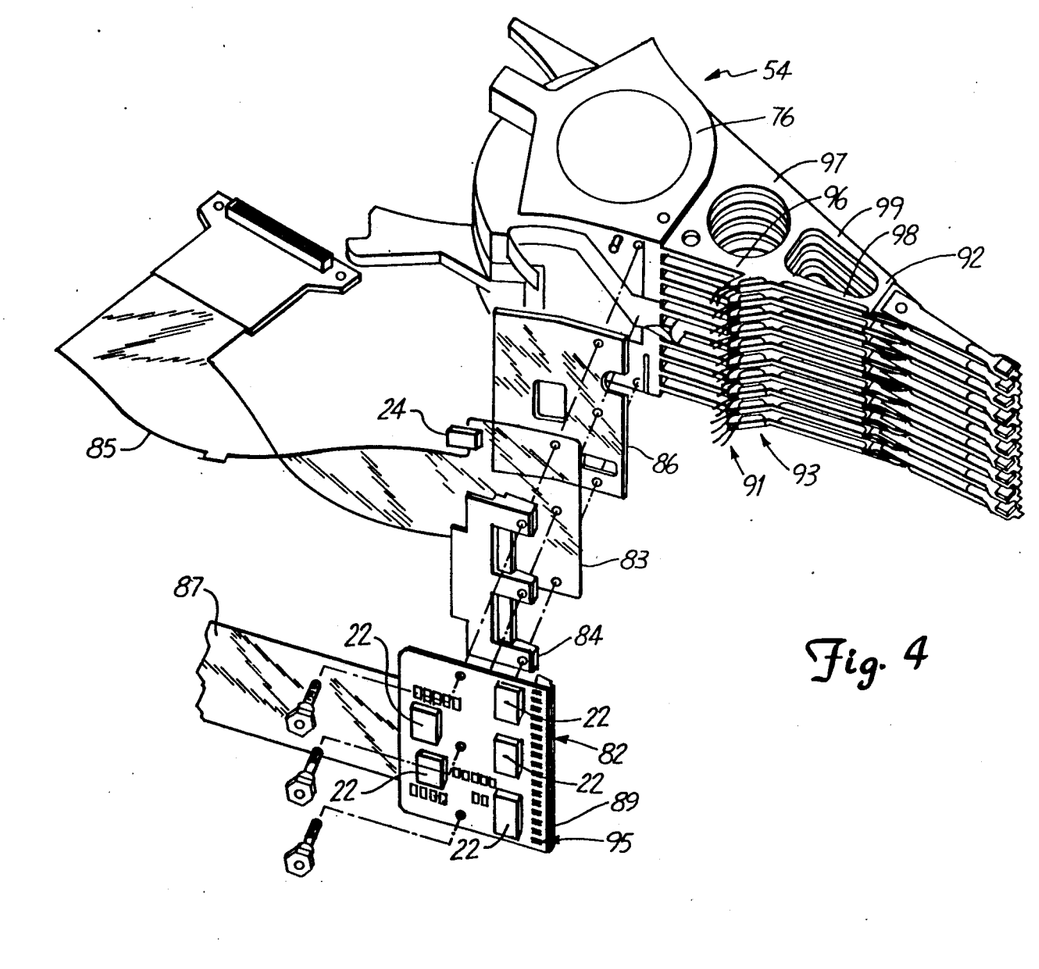
FIG. 4 is an exploded view of a unitary E-block assembly of the present invention.

Transducers 18 and 19 are coupled to electromechanical actuator 20 through load beams and actuator arms or support arms (shown in more detail in FIGS. 2 and 4). Data transducers 18 are also coupled via conductors to data preamps 22. This is indicated by arrow 23. Servo transducer 19 is coupled via a conductor to servo preamp 24. This is indicated by arrow 25.

As data is read from magnetic disks 17 via data transducers 18, data transducers 18 each produce a read signal which is provided to data preamps 22. Data preamps 22 amplify the read signals provided by data transducers 18 according to a predetermined gain and provide the amplified read signal to conditioning logic 26. This is indicated by arrow 28.

The amplified read signals from data preamps 22 are either read in parallel, or serially, depending upon the configuration of conditioning logic 26 and drive control electronics 30. If the data is read serially, drive control electronics 30 provide control signals to conditioning logic 26 to control which particular data disk 17 is to be read from. Drive control electronics 30 provide these signals to conditioning logic 26 as indicated by arrow 32. The data provided to drive control electronics 30 during a read operation is then available to be accessed by host computer 12 through disk controller 11. This is indicated by arrow 31.

Data which is to be written to data disks 17 is provided by host computer 12 to drive control electronics 30 through disk controller 11. Drive control electronics 30 provide a write signal representative of the data provided by host computer 12 to conditioning logic 26, which, in turn, provides the write signal to data preamps 22. Data preamps 22 then amplify the write signal (according to a predetermined gain) and provide it to data transducers 18 which, in turn, write, or magnetically encode the data represented by the write signal on a desired data disk 17 (or to several data disks for a disk drive with a parallel configuration).

Servo transducer 19 reads servo information written on servo disk 16 and provides a servo signal representative of the servo information. The servo signal is provided to servo preamp 24 where it is amplified and provided to conditioning logic 26. This is indicated by arrow 34.

The servo signal is conditioned at conditioning logic 26. The conditioning typically involves demodulation. The demodulated servo signal is then provided to drive control electronics 30. This is indicated by arrow 36. Drive control electronics 30 determine the position of servo transducer 19 relative to concentric tracks on the magnetic disks. Based on the position of the transducers relative to the tracks, drive control electronics 30 provide a position signal to electromechanical actuator 20. This is indicated by arrow 38.

The signal provided by drive control electronics 30 to electromechanical actuator 20 causes electromechanical actuator 20 to rotate and thereby reposition transducers 18 and 19 radially with respect to the concentric tracks on disks 16 and 17. In addition, if host computer 12 commands drive control electronics 30 to perform a track seek operation, drive control electronics 30 provide a signal to electromechanical actuator 20 causing electromechanical actuator 20 to rotate and thereby reposition the transducers 18 and 19 to fly over another track on disks 16 and 17.

FIG. 2 shows a prior support arm assembly 39. A transducer (for example, a data transducer) 40 is attached to a load beam 42 through a gimbal 44. The load beam is attached (typically by screws) to a support arm 46. The support arm 46, in turn, is attached to an actuator coil 48.

Since prior art disk drives had individual support arm assemblies 39, it was possible to assemble each one separately. Therefore, it was possible to surface mount preamplification circuitry 50 directly on each individual support arm 46. Thus, each transducer 40 coupled to a support arm 46 had individual preamplification circuitry 50 mounted directly on the corresponding support arm 46. The preamplification circuitry 50 was then coupled to conditioning logic 26 through an appropriate cable mechanism 52. An E-block assembled from individual arms 46 is very costly since each individual support arm must be extruded and machined. In addition, alignment of the individual arms was difficult since it was extremely critical. Thus, recent developments have introduced a one-piece or unitary E-block. The unitary E-block brings with it significant cost advantages associated with extruding and machining the E-block.

Figure 3:
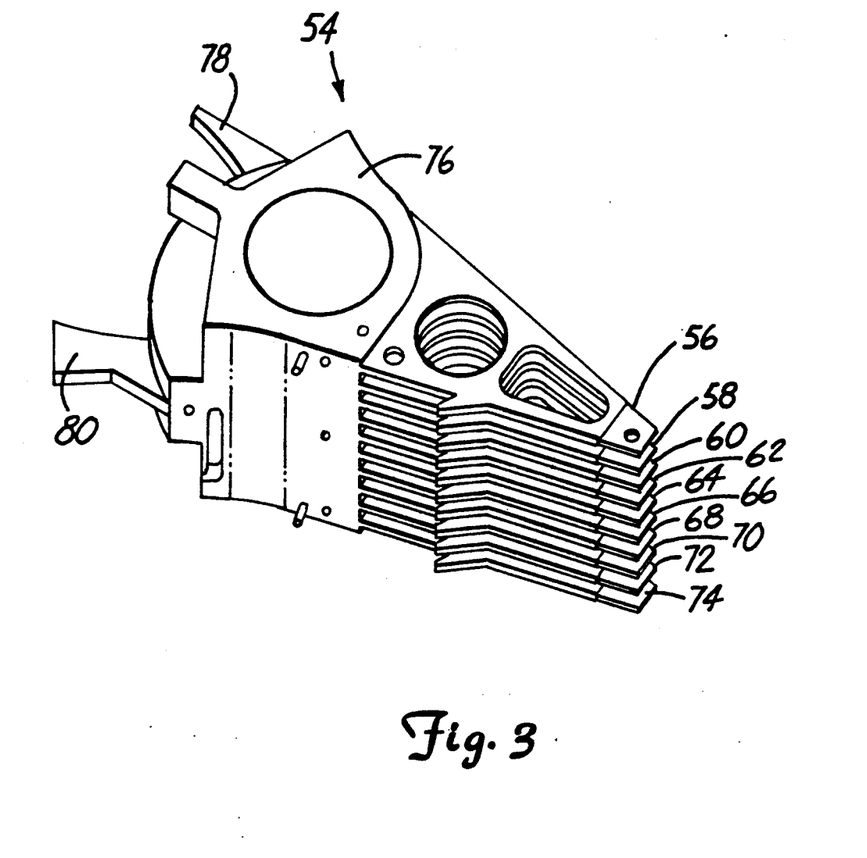
FIG. 3 is a side elevation view of a unitary E-block.

FIG. 3 shows a unitary E-block 54. Unitary E-block 54, in FIG. 3 is shown alone, without transducers, load beams or preamplification circuitry mounted to it. Unitary E-block 54 includes a number of support arms 56, 58, 60, 62, 64, 66, 68, 70, 72 and 74 (collectively referred to as support arms 56-74). Support arms 56-74 are formed integrally with a generally cylindrical base portion 76. Base portion 76 includes legs 78 and 80 which are adapted for accepting an electromechanical actuator coil. Since arms 56-74 are formed integrally, and since the spacing between the arms is very small, it is very difficult, if not impossible, to mount any type of preamplification circuitry on the top or bottom surfaces of the individual support arms 56-74.

FIG. 4 shows unitary E-block 54, shown in FIG. 3, with an exploded view of side-mounted preamplification circuitry. The side-mounted circuitry includes circuit board 82, separator 84, flex circuit 83 and separator 86. In this preferred embodiment, the preamplification circuitry is mounted directly to the side of unitary E-block 54. Flex circuit 83 supports the servo preamp 24 which is used in conjunction with servo transducer 19 (shown in FIG. 1). Flex circuit 83 also includes power and ground connections and connections for receiving control lines for controlling thermal compensation heating elements mounted on the sides of the support arms. The thermal compensation heating elements are more fully described in a patent application entitled APPARATUS FOR CENTERING A TRANSDUCER OVER A TRACK OF A MAGNETIC DISK, Serial No. 390,178, filed Aug. 7, 1989 and assigned to same assignee as the present invention.

In one embodiment, thermal heating elements are disposed on both sides of the support arms in E-block 54. In that case, a flex cable or other suitable connector is provided which wraps around cylindrical base portion 76 of E-block 54 to connect the thermal heating elements on the opposite side of support arms 56-74 to the power lines from a heating element supply (not shown) coupled to flex circuit 83.

Each support arm 56-74 in E-block includes a first arm portion 96 and a second arm portion 97. The arm portions 96 and 97 extend between the free end 92 and the cylindrical base portion 76 of each arm 56-74. The first arm portion 96 is in spaced apart relation to the second arm portion 97 at the cylindrical base portion 76.

Also, a first heating element 98 and a second heating element 99 are attached to the first arm portion 96 and the second arm portion 97, respectively. In the illustrated embodiment, the first and second heating elements 98 and 99 are resistors and are embedded in the first and second arm portions 96 and 97, respectively.

Each arm 56-74, particularly the first arm portion 96 and the second arm portion 97 of each arm, is made of a material such as metal, plastic or a composite material which expands upon heating and contracts upon cooling. Therefore, when the first heating element 98 heats up, the first arm portion 96 expands as a function of the coefficient of linear expansion for the particular material which is used to form the first arm portion 96. Consequently, the transducers 18 and 19 move in a direction across the particular track which they are positioned over. When the first heating element 98 cools, and when the first arm portion 96 of each arm cools, the first arm portion 96 contracts as a function of the coefficient of linear expansion and the transducers 18 and 19 move across the particular tracks in the opposite direction.

Similarly, when the second heating element 99 heats up, the second arm portion 97 expands as a function of the coefficient of linear expansion for the particular material which is used to form the second arm portion 97. Consequently, the transducers 18 and 19 move in a direction across the particular track over which they are positioned. When the second heating element 99 cools, and when the second arm portion 97 of each arm 56-74 cools, the second arm portion 97 contracts as a function of the coefficient of linear expansion and the transducers 18 and 19 move across the track in the opposite direction. The range of movement described above (which is typically in terms of micro inches) and the particular direction of movement depends on the geometry of each arm 56-74, the material from which each arm 56-74 is made and the temperature rise or drop in the first arm portion 96 and the second arm portion 97.

Since the heating element power supply (not shown) controls the first heating element 98 and the second heating element 99 independently, power will be supplied to only one heating element (98 or 99) to correct the position of each arm 56-74. In other words, power will be supplied to the heating element 98 for correction in one direction, and power will be supplied to the heating element 99 for correction in the opposite direction. Moreover, where no correction is required, there will be no power supplied to the first heating element 98 or the second heating element 99.

The embodiment allows a plurality of transducers 18 and 19 on a plurality of arms 56-74 to be accurately positioned over the center of tracks on magnetic disks. Since each arm has a first heating element 98 and a second heating element 99, each of which are positioned in a separate arm portion 96 or 97, the power output of the correction system is zero when no correction is required. Also, even where some correction is required, but where it is not large, if a component in the feedback loop fails thereby causing power supplied to the heating elements 98 and 99 to be interrupted, no large off-track errors will result.

Flex circuit 83 also includes a connection for receiving a power line for a servo motor (not shown) used in repositioning transducers 18 and 19 with respect to tracks on disks 16 and 17 in response to the servo signal provided by servo transducer 19'.

Disk drive systems which are suitable for using the present invention may have either serial or parallel configurations. Depending on which configuration is used, circuit board 82 is configured differently. In the serial configuration, where transducers 18 are read serially, circuit board 82 includes connections for power and ground lines, read and write control lines, read and write data lines, and an actuator ground line. If the disk drive system utilizes a parallel configuration (if data transducers 18 are read in parallel), circuit board 82 includes connections for control lines, nine channels of read lines, nine channels of write lines, isolation (ground) traces, and an actuator ground. Data preamps 22 are also mounted on circuit board 82. Data preamps 22 can be mounted on both sides of circuit board 82.

In the embodiment shown in FIG. 4, flex cables 85 and 87 are coupled to the circuit board 82 and flex circuit 83. The flex cables are also coupled to the drive control electronics 30 through conditioning logic 26.

Figure 5:
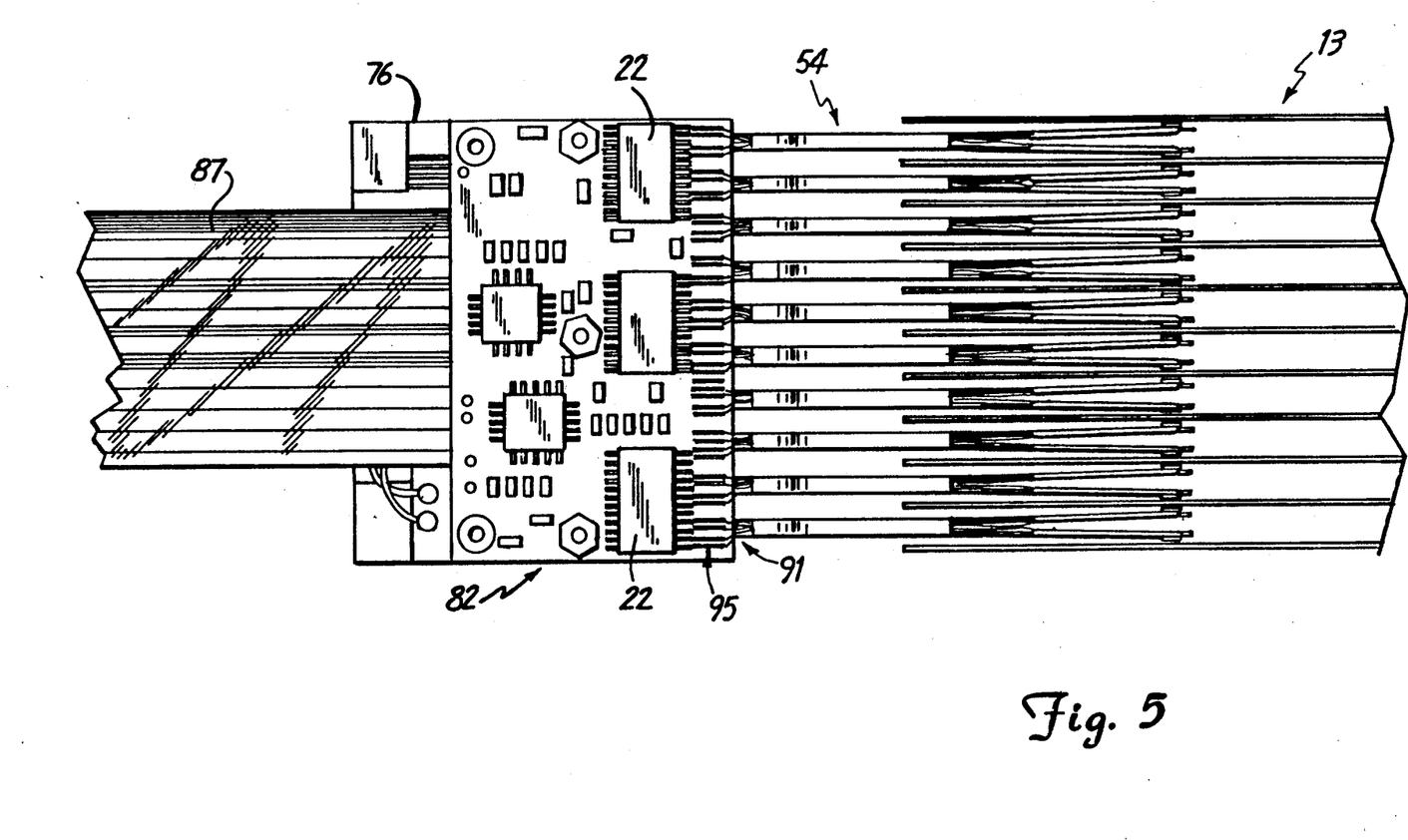
FIG. 5 is a side elevation view of a unitary E-block assembly of the present invention.

Plastic wedge separator 84 separates circuit board 82 from flex circuit 83. The wedge shape of separator 84 allows edge 89 of circuit board 82 to lie closer to arms 52-74. The conductors shown generally at 91 which connect transducers 18 with circuit board 82 (and consequently with the data preamps 22) follow the edges of arms 56-74 up small ramps shown generally at 93. This supports the conductors so that they are at substantially the same level as conductor landing pads shown generally at 95 located along edge 89 of circuit board 82 (as shown in FIG. 5). The conductor connecting servo transducer 19 with the servo preamps 24, on the other hand, does not follow the ramp, but rather goes directly onto flex circuit 83, where it is coupled to servo preamp 24.

By using the side mounted circuits, as well as separator 84, data preamps 22 are physically and electrically isolated from servo preamp 24. This reduces cross talk and other noise which diminishes signal quality and which occurs when there is not effective isolation.

It should also be noted that, in this embodiment, flex circuit 83 and flex cable 85 carries only the servo preamp, power and ground lines, and control lines for the thermal compensation heating elements. Thus, no matter whether the disk drive system utilizes a serial or a parallel configuration, flex circuit 83 and flex cable 85 are the same. Thus, only circuit board 82, along with its corresponding flex cable 87, need to be changed with the configuration of the disk drive system.

Also, by using the side mounted electrical componentry, only two flex cables 85 and 87 are required for coupling the preamplification circuitry with conditioning logic 26 and drive control electronics 30. This eliminates the need to have individual flex cables for each support arm, as was required with previously used individual support arm assemblies.

It should also be noted that, although the present invention is described with reference to circuit board 82 and flex circuit 83, the preamplification components could be carried by a number of suitable component carriers including not only circuit boards, but flex circuits or other types of known component carriers.

FIG. 5 shows the side-mounted preamplification circuitry secured together on the side of the unitary E-block 54. E-block 54 extends between individual disks in stack 13. The side-mounted preamplifier circuitry includes circuit board 82 and flex cable 87. FIG. 5 shows conductor landing pads 95 which are electrically connected to data preamps 22. Conductor landing pads 95 are at substantially the same level as conductors 91.

The use of the side mounted components makes utilization of a unitary E-block truly practical. This provides significant cost advantages in the extrusion and machining of the E-blocks relative to an E-block assembled from individual support arms.

Although the present invention has been described with reference to preferred embodiments, workers skilled in the art will recognize that changes may be made in form and detail without departing from the spirit and scope of the invention.

What is claimed is:

1. An E-block assembly in a disk drive for reading information from and writing information to a plurality of magnetic disks, the E-block assembly comprising:
   a plurality of sliders, each slider including a magnetic transducer for reading information from one of the plurality of magnetic disks;
   a plurality of load beams, each load beam coupled to one of the plurality of sliders;
   a unitary E-block having a first side and a second side and a plurality of integrally formed arms, each of the plurality of load beams being coupled to an arm, the unitary E-block adapted for being coupled to an actuator for moving the arms relative to the magnetic disks; and
   a plurality of component support members mounted to one of the first and second sides of the unitary E-block, the plurality of component support members supporting electrical components for use in reading information from and writing information to the magnetic disks and including at least a first component support member for supporting a first electrical component coupled to the first transducer, the first electrical component used in reading data from and writing data to the magnetic disk; and a second component support member for supporting a second electrical component coupled to the second transducer, the second electrical component amplifying the servo signal.

2. The E-block assembly of claim 1 wherein the plurality of sliders comprises:
   a first slider carrying a first transducer for reading data from and writing data to one of the magnetic disks; and
   a second slider carrying a second transducer for reading servo information from one of the magnetic disks and for producing a servo signal based on the servo information read from the magnetic disk.

3. The E-block assembly of claim 2 wherein the first component support member comprises:
   a flex circuit supporting a data preamp and provided with coupling means for coupling the data preamp to drive control electronics.

4. The E-block assembly of claim 2 wherein the second component support member comprises:
   a flex circuit supporting a servo preamp and provided with coupling means for coupling the servo preamp to drive control electronics.

5. The E-block assembly of claim 2 wherein the first component support member comprises:
   a circuit board supporting a data preamp; and
   a flex cable for coupling the data preamp on the circuit board to drive control electronics.

6. The E-block assembly of claim 2 wherein the second support member comprises:
   a circuit board supporting a servo preamp; and
   a flex cable for coupling the servo preamp on the circuit board to drive control electronics.

7. The E-block assembly of claim 1 wherein the E-block assembly further comprises:
   separation means for separating the first component support member from the second component support member.

8. The E-block of claim 7 wherein the separation means comprises:
   a nonconductive spacing member for mechanically and electrically separating the first component support member from the second component support member.

9. The E-block assembly of claim 8 wherein the nonconductive spacing member comprises:
   a generally wedge shaped spacer coupled between the first component support member and the second component support member.

10. The E-block assembly of claim 1 and further comprising:
    thermal compensation means coupled to at least one side of the unitary E-block.

11. The E-block assembly of claim 10 wherein the thermal compensation means comprises:
    a plurality of heaters, each heater coupled to an arm, for providing thermal repositioning of the arms; and
    a flex cable, coupled to the plurality of heaters, for coupling the heaters to a thermal compensation supply.

12. The E-block assembly of claim 11 wherein the plurality of heaters includes a heater coupled to both sides of at least a portion of the arms and wherein the flex cable couples the heaters on both sides of the arms to the thermal compensation supply.

13. A disk drive, comprising:
    a plurality of magnetic disks;
    a plurality of transducers coupled to a plurality of sliders, the transducers being suitable for reading information stored on the magnetic disks and for producing a read signal representative of the information read, and for writing data to the magnetic disks;
    a plurality of load beams, each slider being coupled to a load beam;
    a unitary E-block having a first side and a second side and a plurality of support arms, each load beam being coupled to a support arm, the unitary E- block being coupled for rotation about a spindle for moving the transducers relative to the magnetic disks;

a plurality of component support members mounted to one of the first and second sides of the unitary E-block, the plurality of component support members carrying electrical components for use in reading information from, and writing information to the magnetic disks, the electrical components including servo read components, data read components and data write components, and the component support members including at least a first support member supporting the servo read components, and a second support member supporting the data read components and the data write components; and control means, coupled to the electrical components, for controlling the electrical components during reading and writing.

14. The disk drive of claim 13 wherein at least one of the plurality of magnetic disks includes a recording surface containing servo information.

15. The disk drive of claim 14 wherein the plurality of transducers comprise:

a data transducer for reading data from one of the plurality of magnetic disks and providing a data signal representative of the data read, and for writing data to the magnetic disk based on a write signal provided by the control means; and a servo transducer for reading servo information from the recording surface containing servo information and providing a servo signal based on the servo information read from the recording surface containing servo information.

16. The disk drive of claim 15 wherein the data read components receive the data signal from the data transducer and provide the data signal to the control means, and wherein the servo read components receive the servo signal from the servo transducer and provide the servo signal to the control means.

17. The disk drive of claim 16 wherein data write components receive the write signal from the control means and provide the write signal to the data transducer to write to the magnetic disk.

18. The disk drive of claim 17 and further comprising:

a separation member for separating the first support member from the second support member.

19. The disk drive of claim 18 wherein the separation member comprises:

a nonconductive separation member for electrically and mechanically separating the first support member from the second support member.

20. The disk drive of claim 18 wherein the separation member comprises:

a wedge shaped member for separating the first support member from the second support member.

21. The disk drive of claim 13 wherein the first support member comprises a first circuit board supporting first components, and wherein the second support member comprises a second circuit board supporting second components.

22. The disk drive of claim 21 and further comprising:

a first flex cable coupled to the control means and the first components; and a second flex cable coupled to the control means and the second components.

23. The disk drive of claim 13 wherein the first support member comprises a first flex circuit supporting first components and coupling the first components to the control means, and wherein the second support member comprises a second flex circuit supporting second components and coupling the second components to the control means.

24. The disk drive of claim 13 and further comprising:

thermal compensation means, coupled to the support arms, for repositioning the transducers relative to the magnetic disks.

25. The disk drive of claim 24 wherein the thermal compensation means comprises:

a plurality of heaters, each heater coupled to a support arm; and a flex cable coupling the heaters to a thermal compensation supply.

26. The disk drive of claim 18 and further comprising:

a second separation member electrically separating the first and second support members from the unitary E-block.

* * * * *